United States Patent
Kariyada (10) Patent No.: US 8,568,851 B2
(45) Date of Patent: Oct. 29, 2013

(54) METHOD FOR MANUFACTURING OPTICAL INFORMATION RECORDING MEDIUM, AND OPTICAL INFORMATION RECORDING MEDIUM

(75) Inventor: Eiji Kariyada, Tokyo (JP)

(73) Assignee: NEC Corporation, Tokyo (JP)

( * ) Notice: Subject to any disclaimer, the term of this patent is extended or adjusted under 35 U.S.C. 154(b) by 39 days.

(21) Appl. No.: 13/262,240

(22) PCT Filed: Mar. 5, 2010

(86) PCT No.: PCT/JP2010/053669
§ 371 (c)(1),
(2), (4) Date: Sep. 30, 2011

(87) PCT Pub. No.: WO2010/113592
PCT Pub. Date: Oct. 7, 2010

(65) Prior Publication Data
US 2012/0021160 A1  Jan. 26, 2012

(30) Foreign Application Priority Data
Mar. 31, 2009 (JP) .................................. 2009-088430

(51) Int. Cl.
*G11B 7/24* (2013.01)
(52) U.S. Cl.
USPC ..................... 428/64.1; 428/64.4; 430/270.11
(58) Field of Classification Search
USPC ..................... 428/64.4; 430/270.11
See application file for complete search history.

(56) References Cited

U.S. PATENT DOCUMENTS 6,821,460 B2 * 11/2004 Kerfeld et al. ............... 264/1.33

FOREIGN PATENT DOCUMENTS

| JP | 64-070939 | 3/1989 |
| JP | 07-121912 | 5/1995 |
| JP | 09-091265 | 4/1997 |
| JP | 10-283682 | 10/1998 |
| JP | 2007-018569 | 1/2007 |
| JP | 2008-159175 | 7/2008 |

OTHER PUBLICATIONS

International Search Report—PCT/JP2010/053669—Apr. 6, 2010.

* cited by examiner

*Primary Examiner* — Elizabeth Mulvaney
(74) *Attorney, Agent, or Firm* — Young & Thompson (57) ABSTRACT

The method of manufacturing an optical information recording medium includes a first resin applying step of applying a first photo-curing resin to one surface of a first substrate, a first resin curing step of laminating a first stamper having an uneven surface on the first photo-curing resin, and irradiating ultraviolet rays via the first stamper to cure the first photo-curing resin, a second resin applying step of applying a second photo-curing resin to the other surface of the first substrate, a second resin curing step of laminating a second stamper having an uneven surface on the second photo-curing resin, and irradiating ultraviolet rays via the first second to cure the second photo-curing resin, a first stamper peeling step of peeling the second stamper from the second photo-curing resin, and a first recording layer laminating step of laminating a first recording layer on an exposed surface of the second photo-curing resin.

10 Claims, 10 Drawing Sheets

FIG. 8F
ULTRAVIOLET RAYS

FIG. 8D
ULTRAVIOLET RAYS

METHOD FOR MANUFACTURING OPTICAL INFORMATION RECORDING MEDIUM, AND OPTICAL INFORMATION RECORDING MEDIUM

TECHNICAL FIELD

The present invention relates to an optical information recording medium having a plurality of information recording layers. Particularly, the invention relates to a method of manufacturing an optical information recording medium having a laminate of unit layers each including a resin layer having an uneven surface and a recording layer laminated on the uneven surface of the resin layer, and an optical information recording medium.

BACKGROUND ART

There is an optical information recording medium having a laminate of unit layers each including a resin layer having an uneven surface and a recording layer laminated on the uneven surface of the resin layer (Patent Literature 1 and Patent Literature 2).

Patent Literature 1 discloses a method of manufacturing an optical information recording medium (optical disc) including the following six steps.
(First step) A liquid ultraviolet-curing resin is dropped onto a grooved resin stamper.
(Second step) A flat resin stamper is laminated on the ultraviolet-curing resin on the grooved resin stamper, and ultraviolet rays are irradiated via the flat resin stamper to cure the ultraviolet-curing resin, thereby forming a first groove transfer layer.
(Third step) The grooved resin stamper is peeled to expose the first groove transfer layer.
(Fourth step) A recording layer is formed on the exposed first groove transfer layer. Further, steps of dropping a liquid ultraviolet-curing resin onto the recording layer, laminating a grooved resin stamper on the ultraviolet-curing resin, irradiating ultraviolet rays via the flat resin stamper to cure the ultraviolet-curing resin, then peeling the grooved resin stamper, and forming a recording layer thereon are repeated to form a laminate having groove transfer layers and recording layers alternately laminated on each other.
(Fifth step) A substrate is adhered onto the topmost recording layer of the laminate, and the flat resin stamper is peeled from the laminate.
(Sixth step) The recording layer of the laminate manufactured separately through the fourth step and the recording layer of the laminate manufactured through the fifth step are adhered so that the recording layers face each other, and then the flat resin stamper is peeled from the laminate manufactured separately through the fourth step.

CITATION LIST

Patent Literatures

Patent Literature 1: Unexamined Japanese Patent Application KOKAI Publication No. 2008-159175
Patent Literature 2: Unexamined Japanese Patent Application KOKAI Publication No. H10-283682

DISCLOSURE OF INVENTION

Problem to be Solved by the Invention

According to the manufacture method disclosed in Patent Literature 1, ultraviolet rays are irradiated via the flat resin stamper so that the amount of ultraviolet rays which reach the ultraviolet-curing resin between the grooved resin stamper and a recording layer becomes smaller than the amount of ultraviolet rays which reach the recording layer and the ultraviolet-curing resin on an underlying recording layer. Therefore, the degree of polymerization of the ultraviolet-curing resin between the grooved resin stamper and the recording layer, i.e., the adhesion strength becomes smaller than that of the ultraviolet-curing resin on another layer. This method is assumed not to cause peeling between a recording layer and an underlying recording layer or between a recording layer and the flat resin stamper.

However, it is difficult to control the amount of ultraviolet rays which reach the ultraviolet-curing resin between the grooved resin stamper and the recording layer. Therefore, it is difficult to control the degree of polymerization of the ultraviolet-curing resin between the grooved resin stamper and the recording layer, so that the adhesion strength of the ultraviolet-curing resin between the grooved resin stamper and the recording layer may not become smaller than that of the ultraviolet-curing resin on another layer. In this case, peeling may occur in an unexpected location, e.g., between a recording layer and an underlying recording layer or between a recording layer and the flat resin stamper.

The invention has been made in view of the foregoing situations, and it is an object of the invention to provide a method of efficiently manufacturing an optical information recording medium by reliably peeling a stamper from an ultraviolet-curing resin layer, and an optical information recording medium manufactured by the method.

Solution to Problem

According to a first aspect of the invention, there is provided a method of manufacturing an optical information recording medium having a laminate of unit layers each including a resin layer having an uneven surface and a recording layer laminated on the uneven surface of the resin layer, the method including:

a first resin applying step of applying a first photo-curing resin to one surface of a first substrate;

a first resin curing step of laminating a first stamper having an uneven surface on the first photo-curing resin applied to the one surface of the first substrate, and irradiating ultraviolet rays onto the first photo-curing resin via the first stamper to cure the first photo-curing resin;

a second resin applying step of applying a second photo-curing resin to the other surface of the first substrate;

a second resin curing step of laminating a second stamper having an uneven surface on the second photo-curing resin applied to the other surface of the first substrate, and irradiating ultraviolet rays onto the second photo-curing resin via the first second to cure the second photo-curing resin;

a first stamper peeling step of peeling the second stamper from the second photo-curing resin; and a first recording layer laminating step of laminating a first recording layer on a surface of the second photo-curing resin which is exposed by peeling of the second stamper.

An optical information recording medium according to a second aspect of the invention is manufactured by the method of manufacturing an optical information recording medium according to the first aspect of the invention.

Advantageous Effects of Invention

According to the invention, an optical information recording medium can be efficiently manufactured by reliably peeling a stamper from an ultraviolet-curing resin layer. In addition, the invention can provide an optical information recording medium efficiently manufactured.

BRIEF DESCRIPTION OF DRAWINGS

FIG. 1 is an exemplary diagram illustrating the schematic structure of an optical information recording medium, FIG. 1A being a plan view while

BEST MODE FOR CARRYING OUT THE INVENTION

[Optical Information Recording Medium]

Figure 1A:
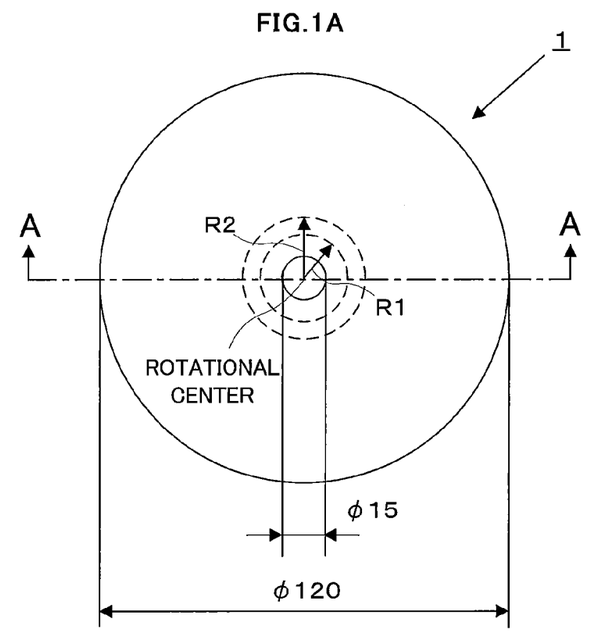

As shown in FIG. 1A, an optical information recording medium 1 has a disk shape with a diameter of 120 mm or so. Information is written on or read out from the optical information recording medium 1 by irradiating laser beam onto the bottom surface thereof.

Figure 1B:
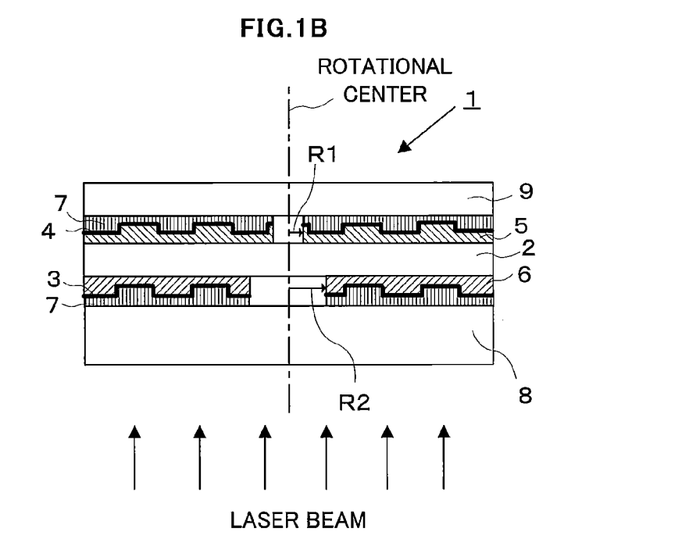
FIG. 1B is a lateral cross-sectional view cut along line A-A in FIG. 1A.

As shown in FIG. 1B, the optical information recording medium 1 has a first recording layer 3 and a second recording layer 4 on and under a first substrate 2, respectively. A first ultraviolet-curing resin layer 5 is laminated between the first substrate 2 and the second recording layer 4. A second ultraviolet-curing resin layer 6 is laminated between the first substrate 2 and the first recording layer 3. A second substrate 8 is disposed under the first recording layer 3. A third substrate 9 is disposed above the second recording layer 4. A third ultraviolet-curing resin layer 7 is laminated between the first recording layer 3 and the second substrate 8, and between the second recording layer 4 and the third substrate 9.

The first substrate 2 is a disk with a diameter of about 120 mm and a thickness of 20 to 30 μm or so. The first substrate 2 includes a base formed by a PC film or the like. The first substrate 2 has optical transparency.

The first recording layer 3 and the second recording layer 4 are, for example, a magneto-optical film, a phase shifting film, a pigmented coat or a hologram film with a thickness of 10 to 100 nm or so. The first recording layer 3 and the second recording layer 4 have recesses and projections. The recesses and projections of the first recording layer 3 and the second recording layer 4 are arranged so as to overlap the same locations when the optical information recording medium 1 is seen in a plan view. That is, arranged on the second recording layer 4 directly above a projection of the first recording layer 3 is a projection having the same shape and the same size as the former projection.

The first ultraviolet-curing resin layer 5 has a thickness of 1 μm or so. The first ultraviolet-curing resin layer 5 is formed by applying a liquid resin to the first substrate 2. The first ultraviolet-curing resin layer 5 is formed from a position away from the rotational center of the first substrate 2 by a length of R1 in a radial direction. The resin for forming the first ultraviolet-curing resin layer 5 is a mixture of a fluorine-contained monomer, tetra ethylene glycol diacrylate, 2-methyl-2-adamantyl acrylate, a surface active agent, and a photopolymerization initiator blended in a predetermined weight ratio. It is to be noted that the mixture has such a property that the lower the ratio of the fluorine-contained monomer content (weight ratio), the higher the degree of polymerization or the greater the adhesion strength to an object to be adhered.

The second ultraviolet-curing resin layer 6 has a thickness of 1 μm or so. The second ultraviolet-curing resin layer 6 is formed by applying a liquid resin to the first substrate 2. The second ultraviolet-curing resin layer 6 is formed from a position away from the rotational center of the first substrate 2 by a length of R2 in a radial direction. The length of R2 in a radial direction is larger than the length of R1 in a radial direction. As a result, the area of the second ultraviolet-curing resin layer 6 is smaller than the area of the first ultraviolet-curing resin layer 5. The resin for forming the second ultraviolet-curing resin layer 6 is a mixture made of the same components as those of the first ultraviolet-curing resin layer 5, with the ratio of the fluorine-contained monomer content (weight ratio) set larger. Accordingly, the second ultraviolet-curing resin layer 6 has a lower adhesion strength to an object to be adhered than the first ultraviolet-curing resin layer 5.

The third ultraviolet-curing resin layer 7 has an average thickness of 0.5 μm or so. A resin which is a mixture made of the same components as those of the first ultraviolet-curing resin layer 5, with the ratio of the fluorine-contained monomer content (weight ratio) set smaller, or a resin which essentially consists of acrylic ester and does not contain a fluorine-contained monomer is selected as the resin for forming the third ultraviolet-curing resin layer 7.

The second substrate 8 is a disk with a diameter of about 120 mm and a thickness of 20 to 30 μm or so. The second substrate 8 includes a base formed by a PC film or the like, and has optical transparency.

The third substrate 9 is a disk with a diameter of about 120 mm and a thickness of 20 to 30 μm or so. The third substrate 9 is a dummy substrate which prevents warping of the optical information recording medium 1 and improves the mechanical strength thereof. The third substrate 9 includes a base formed by a PC film or the like, and has optical transparency.

Next, a method of manufacturing the optical information recording medium 1 will be described.

First Embodiment (First Resin Applying Step)

Figure 2A:
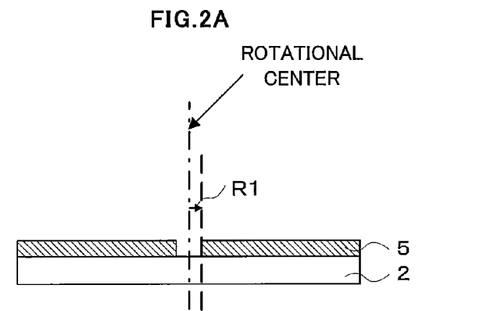
FIG. 2A-2F are lateral cross-sectional views of an optical information recording medium according to a first embodiment of the invention.

First, as shown in FIG. 2A, the first ultraviolet-curing resin layer 5 is formed on one surface of the first substrate 2. The first ultraviolet-curing resin layer 5 is formed by using a spin coater (not shown). Specifically, while the first substrate 2 is rotated fast, a resin is ejected to a position away from the rotational center of the first substrate 2 by the length of R1 in a radial direction. As a consequence, the first ultraviolet-curing resin layer 5 is formed in an annular region extending from a position away from the rotational center of the first substrate 2 by the length of R1 in a radial direction to the periphery thereof.

It is to be noted that deaeration of the resin in vacuum in advance before injecting the resin into the spin coater can prevent minute bubbles from being produced in the first ultraviolet-curing resin layer 5. The same is true of other resin applying steps to be discussed later.

(First Resin Curing Step)

Figure 2B:
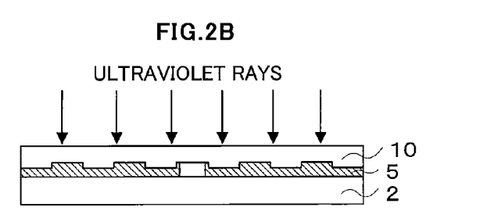

Next, as shown in FIG. 2B, a first stamper 10 is laminated on the first ultraviolet-curing resin layer 5.

The first stamper 10 has an uneven surface. The first stamper 10 is a die for transferring the uneven surface to the first ultraviolet-curing resin layer 5. The first stamper 10 is injection-molded of polycarbonate or the like, and has optical transparency.

The depth of the uneven surface of the first stamper 10 varies according to the wavelength of a laser beam used in writing/reading on/from the optical information recording medium 1 and the recording system of the optical information recording medium 1. When the wavelength of the laser beam is 405 nm and the land/groove type is employed, for example, the depth of the uneven surface is selected so that the depth of the spiral groove becomes 32 nm. In case of the pit type, the depth of the uneven surface is selected so that the depth of the pits becomes 64 nm After laminating the first stamper 10 on the first ultraviolet-curing resin layer 5, ultraviolet rays are irradiated onto the first ultraviolet-curing resin layer 5 from above the first stamper 10 using an ultraviolet-rays irradiating apparatus (not shown) to cure the first ultraviolet-curing resin layer 5.

(Second Resin Applying Step)

Figure 2C:
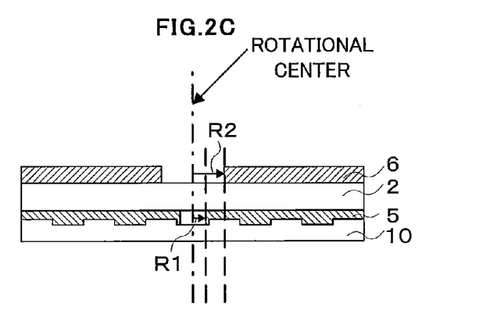

Next, as shown in FIG. 2C, the first substrate 2 is flipped over, and the second ultraviolet-curing resin layer 6 is formed on the other surface of the first substrate 2. The second ultraviolet-curing resin layer 6, like the first ultraviolet-curing resin layer 5, is formed by applying a resin with the spin coater (not shown). The second ultraviolet-curing resin layer 6 is formed in an annular region extending from a position away from the rotational center of the first substrate 2 by the length of R2 in a radial direction to the periphery thereof.

The length of R2 in a radial direction is larger than the length of R1 in a radial direction (see FIG. 2C. That is, the area of the second ultraviolet-curing resin layer 6 is formed to be smaller than the area of the first ultraviolet-curing resin layer 5.

(Second Resin Curing Step)

Figure 2D:
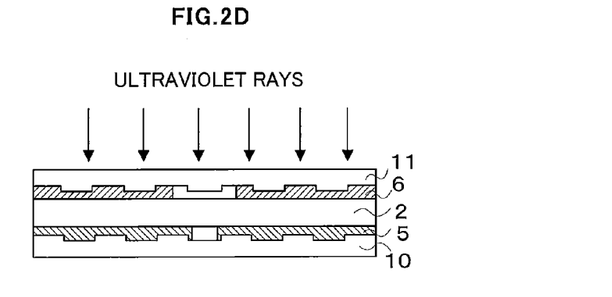

Next, as shown in FIG. 2D, a second stamper 11 is laminated on the second ultraviolet-curing resin layer 6.

The second stamper 11, like the first stamper 10, has an uneven surface. The second stamper 11 is a die for transferring the uneven surface to the second ultraviolet-curing resin layer 6. The second stamper 11 is injection-molded of polycarbonate or the like, and has optical transparency.

After laminating the second stamper 11 on the second ultraviolet-curing resin layer 6, ultraviolet rays are irradiated onto the second ultraviolet-curing resin layer 6 from above the second stamper 11 using the ultraviolet-rays irradiating apparatus (not shown) to cure the second ultraviolet-curing resin layer 6.

(First Stamper Peeling Step)

Figure 2E:
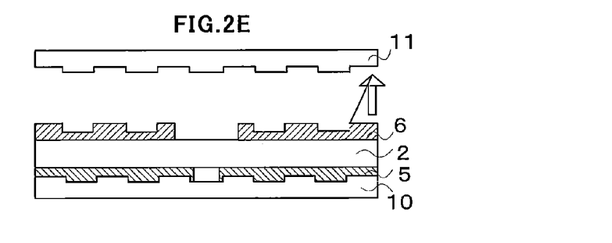

Next, as shown in FIG. 2E, the second stamper 11 is peeled from the second ultraviolet-curing resin layer 6 using a peeling apparatus (not shown) to expose the second ultraviolet-curing resin layer 6.

As mentioned above, the area of the second ultraviolet-curing resin layer 6 is smaller than the area of the first ultraviolet-curing resin layer 5. Since the ratio of the fluorine-contained monomer content in the resin for forming the second ultraviolet-curing resin layer 6 is changed from the ratio of the fluorine-contained monomer content in the resin for forming the first ultraviolet-curing resin layer 5, the first stamper 10 is adhered to the first substrate 2 more firmly than the second stamper 11. Therefore, pulling the first stamper 10 and the second stamper 11 in the opposite directions peels only the second stamper 11 from the second ultraviolet-curing resin layer 6.

(First Recording Layer Laminating Step)

Figure 2F:
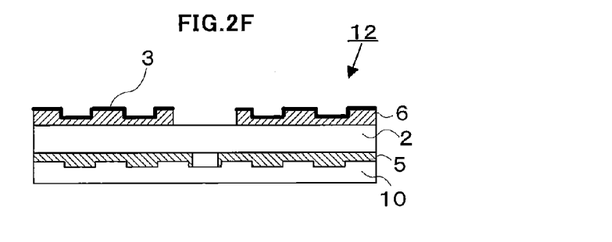

Lastly, as shown in FIG. 2F, the first recording layer 3 is deposited on the second ultraviolet-curing resin layer 6. The first recording layer 3 is deposited by a method, such as vacuum deposition, sputtering, spin coating, die coating, dip coating or spray coating. Needless to say, since the first recording layer 3 is deposited on the surface of the second ultraviolet-curing resin layer 6 where the recesses and projections of the second stamper 11 have been transferred, the first recording layer 3 has an uneven surface. It is to be noted that other recording layers to be discussed later likewise have such uneven surfaces.

For the sake of descriptive convenience hereinafter, a half-finished product of the optical information recording medium 1 as shown in FIG. 2F is called "first block 12".

Second Embodiment

Next, procedures of further processing the first block 12 to complete an optical information recording medium having a double-layered recording layer (hereinafter called "double-layered medium A"), specifically, the optical information recording medium 1 as shown in FIG. 1.

(Third Resin Applying Step)

Figure 3A:
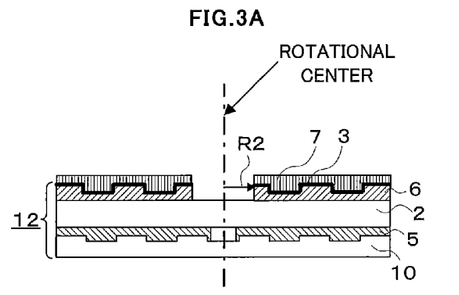
FIG. 3A-3F are lateral cross-sectional views of an optical information recording medium according to a second embodiment of the invention.

First, as shown in FIG. 3A, a third ultraviolet-curing resin layer 7 is formed on the first recording layer 3 of the first block 12. The third ultraviolet-curing resin layer 7 is formed in an annular region extending from a position away from the rotational center of the first substrate 2 by the length of R2 in a radial direction to the periphery thereof. Therefore, the third ultraviolet-curing resin layer 7 has the same area as the first recording layer 3.

The third ultraviolet-curing resin layer 7 is formed thinner than the first ultraviolet-curing resin layer 5. In general, the thinner the thickness of an adhesive to be applied, the less likely defects, such as voids, are formed in the applied adhesive layer and the greater the adhesion strength to an object to be adhered. Therefore, the adhesion strength of the third ultraviolet-curing resin layer 7 becomes greater than that of the first ultraviolet-curing resin layer 5.

(First Substrate Fixing Step)

Figure 3B:
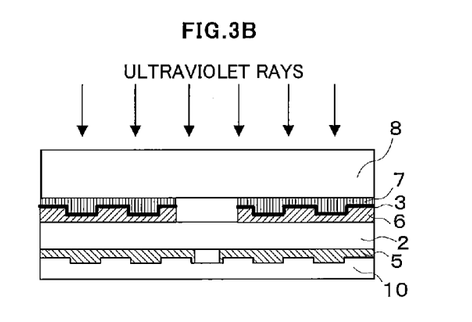

Next, as shown in FIG. 3B, the second substrate 8 is laminated on the third ultraviolet-curing resin layer 7.

With the second substrate 8 laminated, ultraviolet rays are irradiated onto the third ultraviolet-curing resin layer 7 from above the second substrate 8 using the ultraviolet-rays irradiating apparatus (not shown). The irradiation of the ultraviolet rays cures the third ultraviolet-curing resin layer 7 to thereby fix the second substrate 8.

(Second Stamper Peeling Step)

Figure 3C:
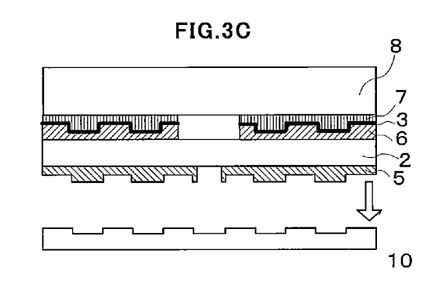

Next, as shown in FIG. 3C, the first stamper 10 is peeled from the first ultraviolet-curing resin layer 5 using the peeling apparatus (not shown) to expose the first ultraviolet-curing resin layer 5.

As mentioned above, the third ultraviolet-curing resin layer 7 is formed thinner than the first ultraviolet-curing resin layer 5. The ratios of the fluorine-contained monomer contents in the resins for forming the third ultraviolet-curing resin layer 7 and the first ultraviolet-curing resin layer 5 are made different from each other. This causes the second substrate 8 to be adhered more firmly than the first stamper 10. Therefore, pulling the second substrate 8 and the first stamper 10 in the opposite directions peels only the first stamper 10 from the first ultraviolet-curing resin layer 5.

(Second Recording Layer Laminating Step)

Figure 3D:
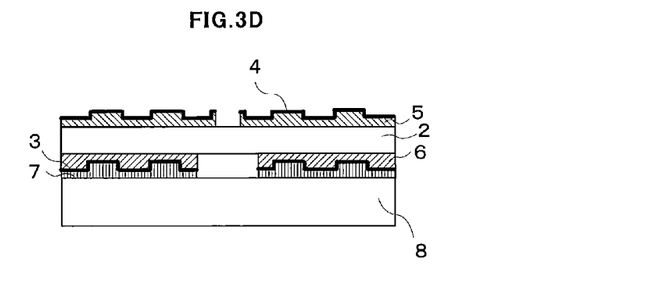

Next, as shown in FIG. 3D, the second substrate 8 is flipped over, and the second recording layer 4 is deposited on the first ultraviolet-curing resin layer 5. The base of the second recording layer 4, the deposition method therefor, and the thickness thereof are the same as those of the first recording layer 3.

(Fourth Resin Applying Step)

Figure 3E:
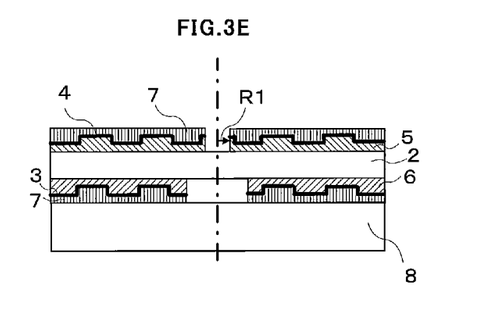

Next, as shown in FIG. 3E, the third ultraviolet-curing resin layer 7 is formed on the second recording layer 4. The third ultraviolet-curing resin layer 7 is formed in an annular region extending from a position away from the rotational center of the first substrate 2 by the length of R1 in a radial direction to the periphery thereof. Therefore, the third ultraviolet-curing resin layer 7 has the same area as the second recording layer 4.

(Second Substrate Fixing Step)

Figure 3F:
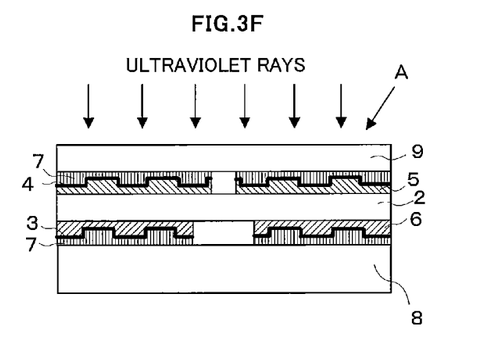

Next, as shown in FIG. 3F, the third substrate 9 is laminated on the third ultraviolet-curing resin layer 7 formed on the second recording layer 4.

With the third substrate 9 laminated, ultraviolet rays are irradiated onto the third ultraviolet-curing resin layer 7 from above the third substrate 9 using the ultraviolet-rays irradiating apparatus (not shown). The irradiation of the ultraviolet rays cures the third ultraviolet-curing resin layer 7 to thereby fix the third substrate 9.

The optical information recording medium 1 (double-layered medium A) is completed through the foregoing process.

Third Embodiment

Next, a method of manufacturing an optical information recording medium having a four-layered recording layer (hereinafter called "four-layered medium B") by further laminating recording layers on the optical information recording medium (double-layered medium A) 1.

Figure 4A:
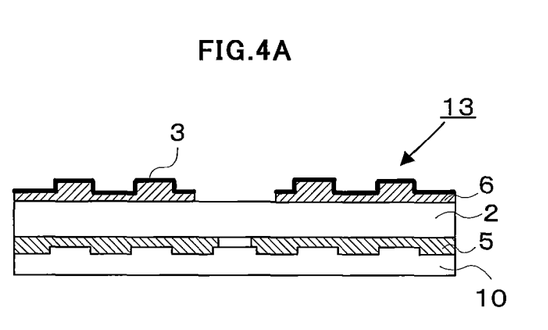
FIG. 4A-4B are lateral cross-sectional views showing the structure of a second block.

To manufacture the four-layered medium B, first, a second block 13 as shown in FIG. 4A is prepared. The second block 13 is a half-finished product of the optical information recording medium 1 which is manufactured through steps similar to those for the first block 12 (see FIG. 4B). The second block 13 differs from the first block 12 in that the recesses and projections of the first recording layer 3 are inverted, and is quite identical in the other structures. Hereinafter, procedures of manufacturing the four-layered medium B from the second block 13 will be described.

(Fifth Resin Applying Step)

Figure 5A:
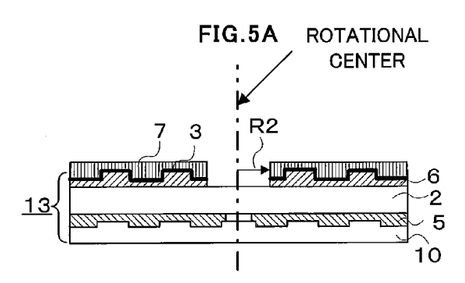
FIG. 5A-5F are lateral cross-sectional views of an optical information recording medium according to a third embodiment of the invention.

First, as shown in FIG. 5A, a third ultraviolet-curing resin layer 7 is formed on the first recording layer 3 of the second block 13. The third ultraviolet-curing resin layer 7 is formed in an annular region extending from a position away from the rotational center of the first substrate 2 by the length of R2 in a radial direction to the periphery thereof. Therefore, the third ultraviolet-curing resin layer 7 has the same area as the first recording layer 3.

(Third Substrate Fixing Step)

Figure 5B:
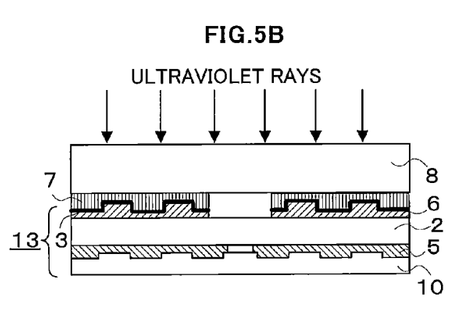

Next, as shown in FIG. 5B, the second substrate 8 is laminated on the third ultraviolet-curing resin layer 7.

With the second substrate 8 laminated, ultraviolet rays are irradiated onto the third ultraviolet-curing resin layer 7 from above the second substrate 8 using the ultraviolet-rays irradiating apparatus (not shown). The irradiation of the ultraviolet rays cures the third ultraviolet-curing resin layer 7 to thereby fix the second substrate 8.

(Third Stamper Peeling Step)

Figure 5C:
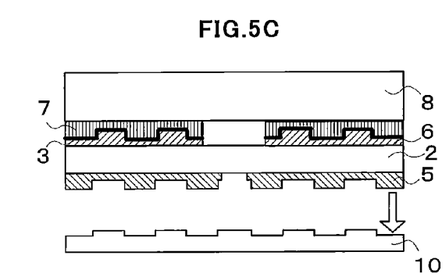

Next, as shown in FIG. 5C, the first stamper 10 is peeled from the first ultraviolet-curing resin layer 5 using the peeling apparatus (not shown) to expose the first ultraviolet-curing resin layer 5.

(Third Recording Layer Laminating Step)

Figure 5D:
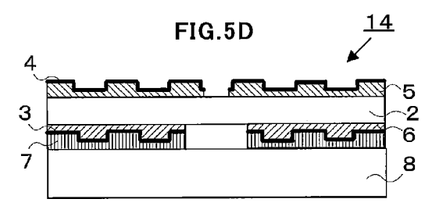

Next, as shown in FIG. 5D, the second substrate 8 is flipped over to make the first ultraviolet-curing resin layer 5 face upward, and the second recording layer 4 is deposited on the first ultraviolet-curing resin layer 5. The base of the second recording layer 4, the deposition method therefor, and the thickness thereof are the same as those of the first recording layer 3.

For the sake of descriptive convenience hereinafter, a half-finished product of the four-layered medium B as shown in FIG. 5D is called "third block 12".

(Sixth Resin Applying Step)

Figure 5E:
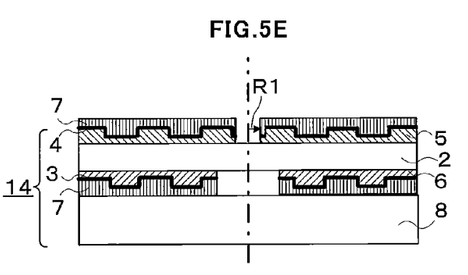

Next, as shown in FIG. 5E, the third ultraviolet-curing resin layer 7 is formed on the second recording layer 4 of the third block 14. The third ultraviolet-curing resin layer 7 is formed in an annular region extending from a position away from the rotational center of the first substrate 2 by the length of R1 in a radial direction to the periphery thereof. Therefore, the third ultraviolet-curing resin layer 7 has the same area as the second recording layer 4.

(First Double-Layered Medium Fixing Step)

Figure 5F:
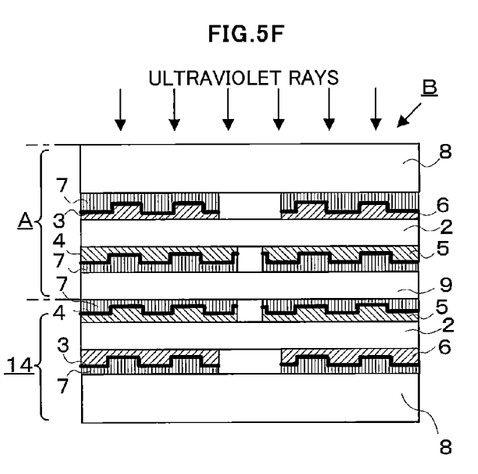

Next, as shown in FIG. 5F, the optical information recording medium (double-layered medium A) 1 separately manufactured is laminated on the third block 14.

Then, ultraviolet rays are irradiated onto the third ultraviolet-curing resin layer 7 from above the second substrate 8 of the double-layered medium A using the ultraviolet-rays irradiating apparatus (not shown). The irradiation of the ultraviolet rays cures the third ultraviolet-curing resin layer 7 to thereby fix the double-layered medium A.

The optical information recording medium 1 (four-layered medium B) is completed through the foregoing process.

Fourth Embodiment

Figure 4B:
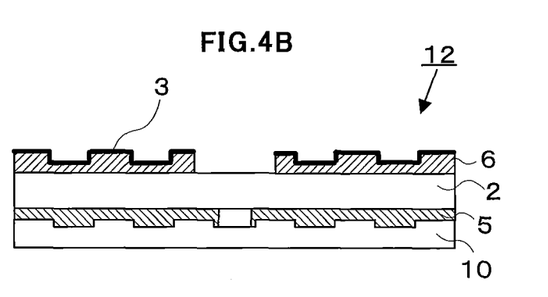

The four-layered medium B may be manufactured by laminating the second block 13 (see FIG. 4A) and the first block 12 (see FIG. 4B). Hereinafter, the procedures of the manufacture will be described referring to FIG. 6.

(Seventh Resin Applying Step)

Figure 6A:
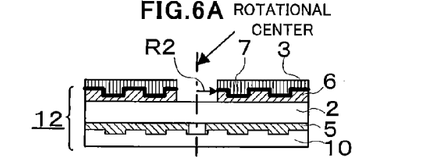
FIG. 6A-6L are lateral cross-sectional views of an optical information recording medium according to a fourth embodiment of the invention.

First, as shown in FIG. 6A, the third ultraviolet-curing resin layer 7 is formed on the first recording layer 3 of the first block 12. The third ultraviolet-curing resin layer 7 is formed in an annular region extending from a position away from the rotational center of the first substrate 2 by the length of R2 in a radial direction to the periphery thereof. Therefore, the third ultraviolet-curing resin layer 7 has the same area as the first recording layer 3.

(Fourth Substrate Fixing Step)

Figure 6B:
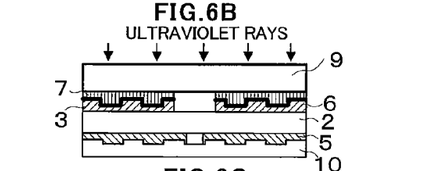

Next, as shown in FIG. 6B, the third substrate 9 is laminated on the third ultraviolet-curing resin layer 7 formed on the first recording layer 3.

With the third substrate 9 laminated, ultraviolet rays are irradiated onto the third ultraviolet-curing resin layer 7 from above the third substrate 9 using the ultraviolet-rays irradiating apparatus (not shown). The irradiation of the ultraviolet rays cures the third ultraviolet-curing resin layer 7 to thereby fix the third substrate 9.

(Eighth Resin Applying Step)

Figure 6C:
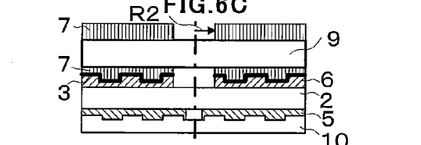

Next, as shown in FIG. 6C, the third ultraviolet-curing resin layer 7 is formed on the third substrate 9. The third ultraviolet-curing resin layer 7 is formed in an annular region extending from a position away from the rotational center of the first substrate 2 by the length of R2 in a radial direction to the periphery thereof. Therefore, the third ultraviolet-curing resin layer 7 has the same area as the first recording layer 3.

(First Block Fixing Step)

Figure 6D:
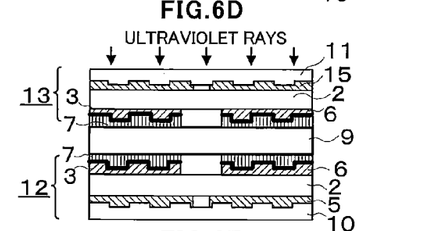

Next, as shown in FIG. 6D, the second block 13 separately manufactured is laminated on the first block 12.

With the second block 13 laminated, ultraviolet rays are irradiated onto the third ultraviolet-curing resin layer 7 from above the second stamper 11 using the ultraviolet-rays irradiating apparatus (not shown). The irradiation of the ultraviolet rays cures the third ultraviolet-curing resin layer 7 to thereby fix the second block 13 to the first block 12.

(Fourth Stamper Peeling Step)

Figure 6E:
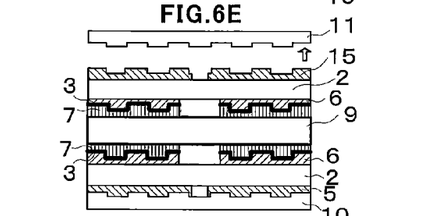

Next, as shown in FIG. 6E, the second stamper 11 is peeled from a fourth ultraviolet-curing resin layer 15 using the peeling apparatus (not shown) to expose the fourth ultraviolet-curing resin layer 15.

As mentioned above, the area of the fourth ultraviolet-curing resin layer 15 is smaller than the area of the first ultraviolet-curing resin layer 5. Since the ratio of the fluorine-contained monomer content in the resin for forming the fourth ultraviolet-curing resin layer 15 is changed from the ratio of the fluorine-contained monomer content in the resin for forming the first ultraviolet-curing resin layer 5, the first stamper 10 is adhered to the first substrate 2 more firmly than the second stamper 11. Therefore, pulling the first stamper 10 and the second stamper 11 in the opposite directions peels only the second stamper 11 from the fourth ultraviolet-curing resin layer 15.

(Fourth Recording Layer Laminating Step)

Figure 6F:
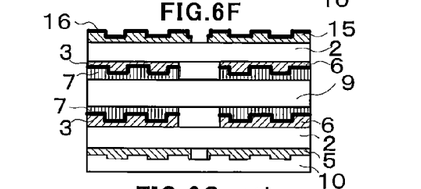

Next, as shown in FIG. 6F, a third recording layer 16 is deposited on the fourth ultraviolet-curing resin layer 15.

(Ninth Resin Applying Step)

Figure 6G:
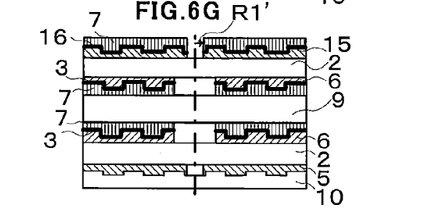

Next, as shown in FIG. 6G, the third ultraviolet-curing resin layer 7 is formed on the third recording layer 16. The third ultraviolet-curing resin layer 7 is formed in an annular region extending from a position away from the rotational center of the first substrate 2 by the R1 length in a radial direction to the periphery thereof. Therefore, the third ultraviolet-curing resin layer 7 has the same area as the third recording layer 16.

(Fifth Substrate Fixing Step)

Figure 6H:
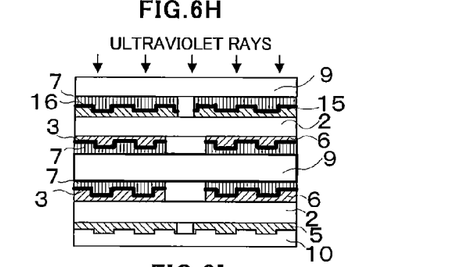

Next, as shown in FIG. 6H, the third substrate 9 is laminated on the third ultraviolet-curing resin layer 7 formed on the third recording layer 16.

With the third substrate 9 laminated, ultraviolet rays are irradiated onto the third ultraviolet-curing resin layer 7 from above the third substrate 9 using the ultraviolet-rays irradiating apparatus (not shown). The irradiation of the ultraviolet rays cures the third ultraviolet-curing resin layer 7 to thereby fix the third substrate 9.

(Fifth Stamper Peeling Step)

Figure 6I:
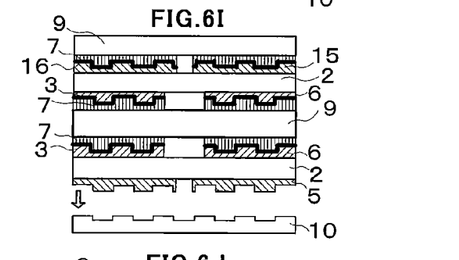

Next, as shown in FIG. 6I, the first stamper 10 is peeled from the first ultraviolet-curing resin layer 5 using the peeling apparatus (not shown) to expose the first ultraviolet-curing resin layer 5.

(Fifth Recording Layer Laminating Step)

Figure 6J:
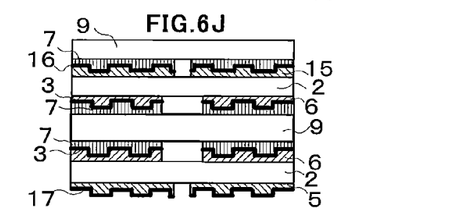

Next, as shown in FIG. 6J, a fourth recording layer 17 is deposited on the first ultraviolet-curing resin layer 5.

(Tenth Resin Applying Step)

Figure 6K:
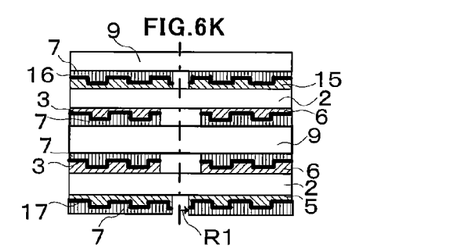

Next, as shown in FIG. 6K, the third ultraviolet-curing resin layer 7 is formed on the fourth recording layer 17. The third ultraviolet-curing resin layer 7 is formed in an annular region extending from a position away from the rotational center of the first substrate 2 by the length of R1 in a radial direction to the periphery thereof. Therefore, the third ultraviolet-curing resin layer 7 has the same area as the fourth recording layer 17.

(Sixth Substrate Fixing Step)

Figure 6L:
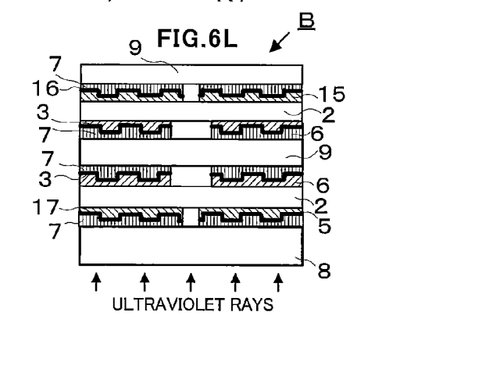

Lastly, as shown in FIG. 6L, the second substrate 8 is laminated on the third ultraviolet-curing resin layer 7 laminated on the fourth recording layer 17.

With the second substrate 8 laminated, ultraviolet rays are irradiated onto the third ultraviolet-curing resin layer 7 from above the second substrate 8 using the ultraviolet-rays irradiating apparatus (not shown). The irradiation of the ultraviolet rays cures the third ultraviolet-curing resin layer 7 to thereby fix the second substrate 8.

The optical information recording medium 1 (four-layered medium B) is completed through the foregoing process.

Fifth Embodiment

The four-layered medium B may be manufactured by laminating two first blocks 12 (see FIG. 4B). Hereinafter, the procedures of the manufacture will be described referring to FIG. 7.

(Second Block Fixing Step)

Figure 7A:
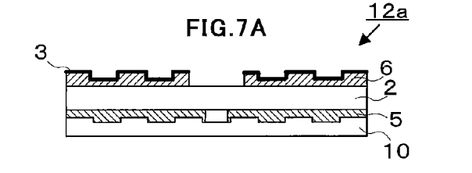
FIG. 7A-7J are lateral cross-sectional views of an optical information recording medium according to a fifth embodiment of the invention.
Figure 7B:
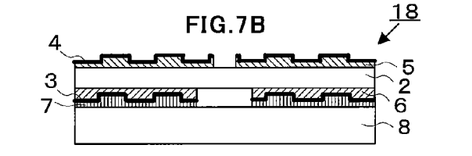

First, the third ultraviolet-curing resin layer 7 and the second substrate 8 are laminated on the first recording layer 3 of a first block 12a shown in FIG. 7A. Next, the first stamper 10 is removed. The second recording layer 4 is laminated, and processed to a state shown in FIG. 7B. The procedures so far are the same as those of the second embodiment. Here, a half-finished product processed to the state shown in FIG. 7B is called "fourth block 18".

(Eleventh Resin Applying Step)

Figure 7C:
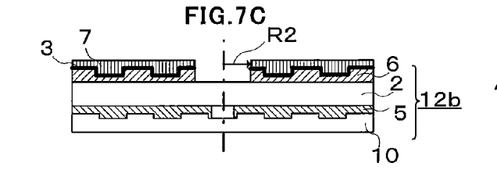

Next, as shown in FIG. 7C, the third ultraviolet-curing resin layer 7 is formed on the first recording layer 3 of another first block 12b. The third ultraviolet-curing resin layer 7 is formed in an annular region extending from a position away from the rotational center of the first substrate 2 by the length of R2 in a radial direction to the periphery thereof. Therefore, the third ultraviolet-curing resin layer 7 has the same area as the first recording layer 3.

(Seventh Substrate Fixing Step)

Figure 7D:
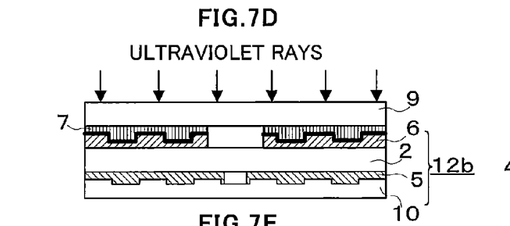

Next, as shown in FIG. 7D, the third substrate 9 is laminated on the third ultraviolet-curing resin layer 7.

With the third substrate 9 laminated, ultraviolet rays are irradiated onto the third ultraviolet-curing resin layer 7 from above the third substrate 9 using the ultraviolet-rays irradiating apparatus (not shown). The irradiation of the ultraviolet rays cures the third ultraviolet-curing resin layer 7 to thereby fix the third substrate 9.

(Twelfth Resin Applying Step)

Figure 7E:
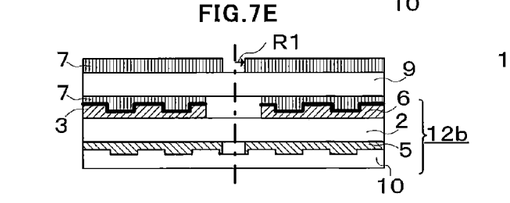

Next, as shown in FIG. 7E, the third ultraviolet-curing resin layer 7 is formed on the third substrate 9. The third ultraviolet-curing resin layer 7 is formed in an annular region extending from a position away from the rotational center of the first substrate 2 by the length of R1 in a radial direction to the periphery thereof. Therefore, the third ultraviolet-curing resin layer 7 has the same area as the second recording layer 4 included in the fourth block 18.

(Third Block Fixing Step)

Figure 7F:
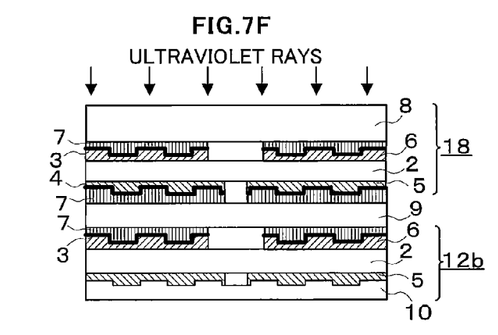

Next, as shown in FIG. 7F, the fourth block 18 is laminated on the third ultraviolet-curing resin layer 7 of the first block 12b.

With the fourth block 18 laminated on the first block 12b, ultraviolet rays are irradiated onto the third ultraviolet-curing resin layer 7 from above the second substrate 8 of the fourth block 18 using the ultraviolet-rays irradiating apparatus (not shown). The irradiation of the ultraviolet rays cures the third ultraviolet-curing resin layer 7 to thereby fix the fourth block 18 to the first block 12b.

(Sixth Stamper Peeling Step)

Figure 7G:
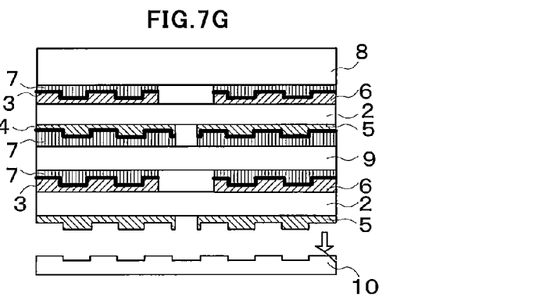

Next, as shown in FIG. 7G, the first stamper 10 is peeled from the first ultraviolet-curing resin layer 5 using the peeling apparatus (not shown) to expose the first ultraviolet-curing resin layer 5.

(Sixth Recording Layer Laminating Step)

Figure 7H:
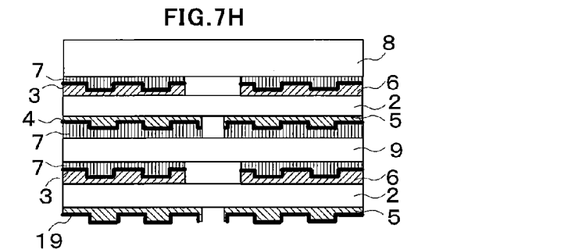

Next, as shown in FIG. 7H, a fifth recording layer 19 is deposited on the first ultraviolet-curing resin layer 5.

(Thirteenth Resin Applying Step)

Figure 7I:
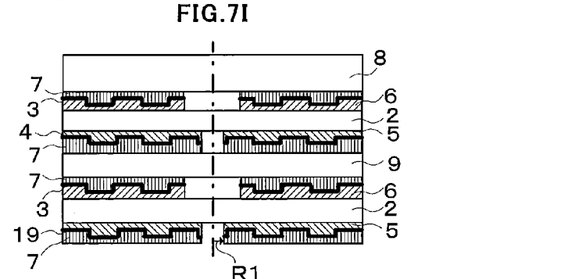

Next, as shown in FIG. 7I, the third ultraviolet-curing resin layer 7 is formed on the fifth recording layer 19. The third ultraviolet-curing resin layer 7 is formed in an annular region extending from a position away from the rotational center of the first substrate 2 by the length of R1 in a radial direction to the periphery thereof. Therefore, the third ultraviolet-curing resin layer 7 has the same area as the fifth recording layer 19.

(Eighth Substrate Fixing Step)

Figure 7J:
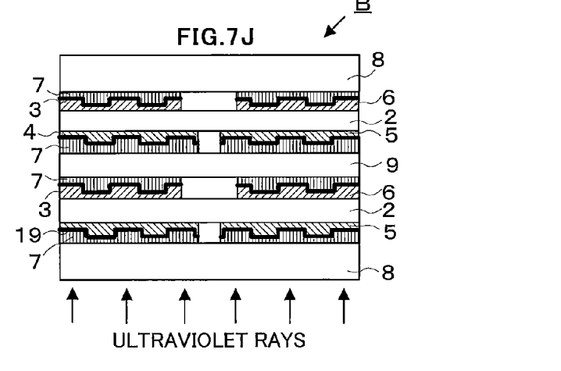

Lastly, as shown in FIG. 7J, the second substrate 8 is laminated on the third ultraviolet-curing resin layer 7 laminated on the fifth recording layer 19.

With the second substrate 8 laminated, ultraviolet rays are irradiated onto the third ultraviolet-curing resin layer 7 from above the second substrate 8 using the ultraviolet-rays irradiating apparatus (not shown). The irradiation of the ultraviolet rays cures the third ultraviolet-curing resin layer 7 to thereby fix the second substrate 8.

The optical information recording medium 1 (four-layered medium B) is completed through the foregoing process.

Sixth Embodiment

An optical information recording medium 1 which has 2N(N being a natural number) recording layers provided by laminating recording layers on the first block 12 (see FIG. 4B). (Hereinafter, the medium is called "2N-layered medium C".) Hereinafter, the procedures of the manufacture will be described referring to FIG. 8.

(Seventh Stamper Peeling Step)

Figure 8A:
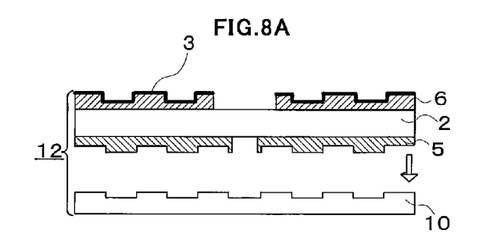
FIG. 8A-8G are lateral cross-sectional views of an optical information recording medium according to a sixth embodiment of the invention.

First, as shown in FIG. 8A, the first stamper 10 of the first block 12 is peeled from the first ultraviolet-curing resin layer 5 using the peeling apparatus (not shown) to expose the first ultraviolet-curing resin layer 5.

(Seventh Recording Layer Laminating Step)

Figure 8B:
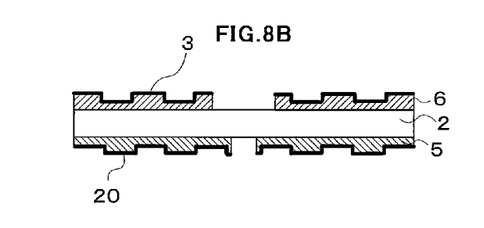

Next, as shown in FIG. 8B, a sixth recording layer 20 is deposited on the first ultraviolet-curing resin layer 5.

(First-Substrate Duplicating Step)

The above step is repeated N times to duplicate N first substrates 2 having the sixth recording layer 20 deposited thereon as shown in FIG. 8B.

(Fourteenth Resin Applying Step)

Figure 8C:
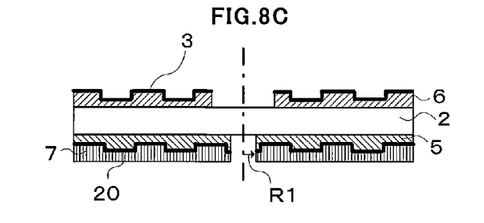

Next, as shown in FIG. 8C, the third ultraviolet-curing resin layer 7 is formed on the sixth recording layer 20. The third ultraviolet-curing resin layer 7 is formed in an annular region extending from a position away from the rotational center of the first substrate 2 by the length of R1 in a radial direction to the periphery thereof. Therefore, the third ultraviolet-curing resin layer 7 has the same area as the sixth recording layer 20.

(Ninth Substrate Fixing Step)

Figure 8D:
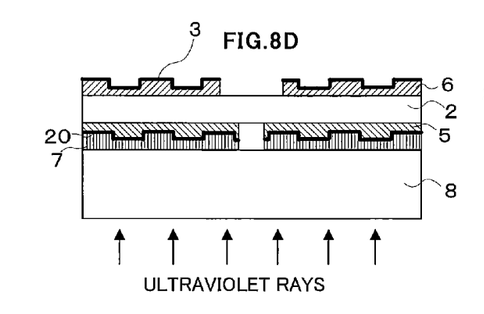

Next, as shown in FIG. 8D, the second substrate 8 is laminated on the third ultraviolet-curing resin layer 7 laminated on the sixth recording layer 20.

With the second substrate 8 laminated, ultraviolet rays are irradiated onto the third ultraviolet-curing resin layer 7 from above the second substrate 8 using the ultraviolet-rays irradiating apparatus (not shown). The irradiation of the ultraviolet rays cures the third ultraviolet-curing resin layer 7 to thereby fix the second substrate 8.

(Fifteenth Resin Applying Step)

Figure 8E:
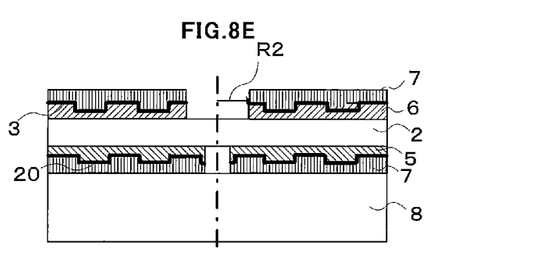

Next, as shown in FIG. 8E, the third ultraviolet-curing resin layer 7 is formed on the first recording layer 3. The third ultraviolet-curing resin layer 7 is formed in an annular region extending from a position away from the rotational center of the first substrate 2 by the length of R2 in a radial direction to the periphery thereof. Therefore, the third ultraviolet-curing resin layer 7 has the same area as the first recording layer 3.

(Tenth Substrate Fixing Step)

Figure 8F:
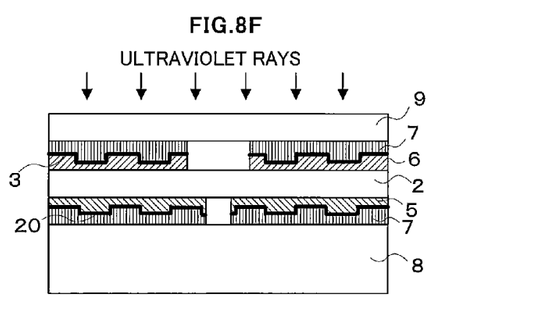
Figure 8G:
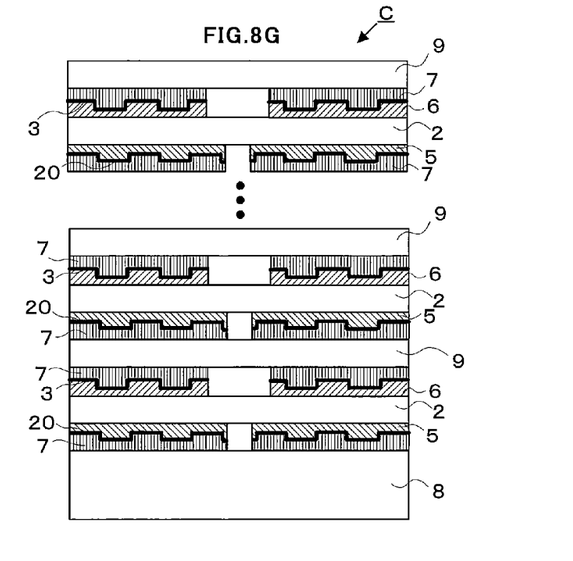

Next, as shown in FIG. 8F, the third substrate 9 is laminated on the third ultraviolet-curing resin layer 7 formed on the first recording layer 3.

With the third substrate 9 laminated, ultraviolet rays are irradiated onto the third ultraviolet-curing resin layer 7 from above the third substrate 9 using the ultraviolet-rays irradiating apparatus (not shown). The irradiation of the ultraviolet rays cures the third ultraviolet-curing resin layer 7 to thereby fix the third substrate 9.

(First Recording-Layer Layout Step)

Lastly, the above steps are repeated to alternately laminate the first substrate 2 and the third substrate 9 on which the sixth recording layers 20 are laminated, by N−1 times, and fix the substrates. As a result, a structure having a 2N-layered recording layer is formed.

The optical information recording medium 1 (N-layered medium C) is completed through the foregoing process.

Example 1

The following will illustrate examples, and will exemplify the invention in more detail. The following examples are not to be considered as restricting the technical scope of the invention.

Figure 9:
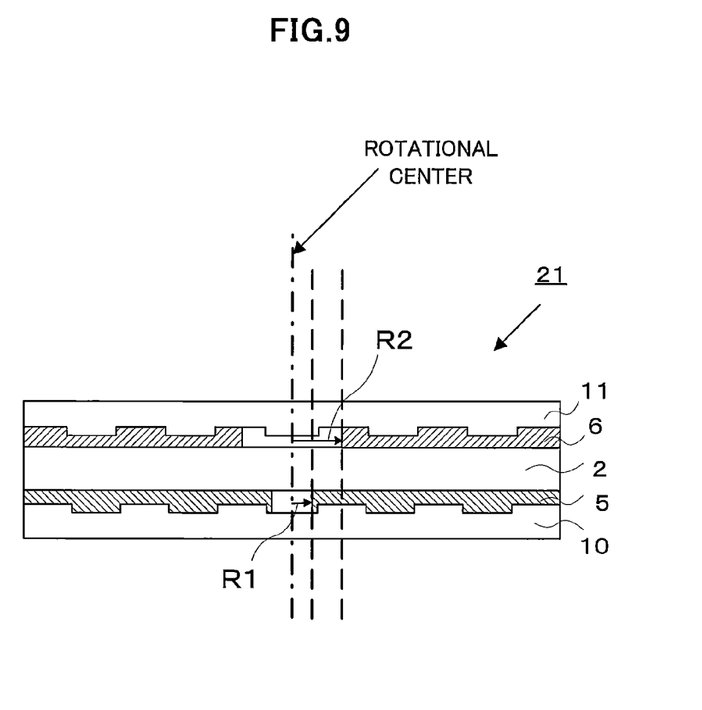
FIG. 9 is a lateral cross-sectional view of an optical information recording medium according to an Example 1 of the invention.

The advantages of the invention were checked using a sample 21 as shown in FIG. 9.

The sample 21 is a disk with a diameter of 120 mm. The sample 21 is acquired by laminating the first ultraviolet-curing resin layer 5 and the second ultraviolet-curing resin layer 6 on and under the first substrate 2, and further laminating the first stamper 10 on the bottom surface of the first ultraviolet-curing resin layer 5 and the second stamper 11 on the top surface of the second ultraviolet-curing resin layer 6.

A PC film with a thickness of 25 μm was used for the first substrate 2. A polycarbonate resin was used for the first stamper 10 and the second stamper 11. The first stamper 10 and the second stamper 11 have recesses and projections with a depth of 64 nm The first ultraviolet-curing resin layer 5 was formed by applying a resin to be discussed later in an annular region extending from a position away from the rotational center of the sample 21 by the length of R1 in a radial direction to the periphery thereof by spin coating. The second ultraviolet-curing resin layer 6 was formed by applying a resin to be discussed later in an annular region extending from a position away from the rotational center of the sample 21 by the length of R2 in a radial direction to the periphery thereof by spin coating. Both of the first and second ultraviolet-curing resin layers 5, 6 have a thickness of 1 μm.

The resins for forming the first and second ultraviolet-curing resin layers 5, 6 have compositions as given in Table 1. As apparent from Table 1, the ratio of the fluorine-contained monomer content in the resin for forming the first ultraviolet-curing resin layer 5 is set smaller than the ratio of the fluorine-contained monomer content in the resin for forming the second ultraviolet-curing resin layer.

TABLE 1

| Components | Resin for forming first ultraviolet-curing resin layer 5 | Resin for forming second ultraviolet-curing resin layer 6 |
| --- | --- | --- |
| Fluorine-contained monomer | 15 wt. % | 25 wt. % |
| Tetra ethylene glycol diacrylate | 40 wt. % | 35 wt. % |
| 2-methyl-2-adamantyl acrylate | 40 wt. % | 35 wt. % |
| Surface active agent | 1 wt. % | 1 wt. % |
| Photopolymerization initiator | 4 wt. % | 4 wt. % |

Samples 21 with the difference (R2−R1) between the length of R2 in a radial direction and the length of R1 in a radial direction being varied were prepared, and subjected to an experiment in which the first and second stampers 10, 11 were peeled from each sample 21. A 180-degree peeling tester conforming to BS K-6854-2 was used in the test. Table 2 shows the results.

TABLE 2

| R2 − R1 (mm) | When peeled from first stamper 10 | When peeled from second stamper 11 |
| --- | --- | --- |
| 0 | Second stamper 11 also peeled | First stamper 10 also peeled |
| 0.2 | Second stamper 11 also peeled | First stamper 10 also peeled |
| 0.4 | Second stamper 11 also peeled | Part of first stamper 10 peeled |
| 0.5 | Second stamper 11 also peeled | Only second stamper 11 peeled |
| 1 | Second stamper 11 also peeled | Only second stamper 11 peeled |
| 5 | Second stamper 11 also peeled | Only second stamper 11 peeled |
| 10 | Second stamper 11 also peeled | Only second stamper 11 peeled |
| 15 | Second stamper 11 also peeled | Only second stamper 11 peeled |
| 20 | Second stamper 11 also peeled | Only second stamper 11 peeled |

It is apparent from Table 2 that in the case of peeling from the first stamper 10, the second stamper 11 is peeled at the same time, regardless of the value of R2−R1. In the case of peeling from the second stamper 11, on the other hand, the first stamper 10 is peeled at the same time when the value of R2−R1 is in the range of 0 to 0.4 mm, while only the second stamper 11 can be peeled when the value of R2−R1 becomes 0.5 mm or greater.

Comparative Example 1

Resins shown in Table 3 were formed as the resins for forming the first and second ultraviolet-curing resin layers 5, 6 of the same sample 21 as the Example 1, and the comparative example was compared with the Example 1.

TABLE 3

| Components | Resin for forming first ultraviolet-curing resin layer 5 | Resin for forming second ultraviolet-curing resin layer 6 |
| --- | --- | --- |
| Fluorine-contained monomer | 20 wt. % | 20 wt. % |
| Tetra ethylene glycol diacrylate | 35 wt. % | 35 wt. % |
| 2-methyl-2-adamantyl acrylate | 40 wt. % | 40 wt. % |
| Surface active agent | 1 wt. % | 1 wt. % |
| Photopolymerization initiator | 4 wt. % | 4 wt. % |

As in the Example 1, samples 21 with the difference (R2−R1) between the length of R2 in a radial direction and the length of R1 in a radial direction being varied were prepared, and subjected to an experiment in which the first and second stampers 10, 11 were peeled from each sample 21. A 180-degree peeling tester conforming to JIS K-6854-2 was used in the test. Table 4 shows the results.

TABLE 4

| R2 − R1 (mm) | When peeled from first stamper 10 | When peeled from second stamper 11 |
| --- | --- | --- |
| 0 | Second stamper 11 also peeled | First stamper 10 also peeled |
| 0.2 | Second stamper 11 also peeled | First stamper 10 also peeled |
| 0.4 | Second stamper 11 also peeled | First stamper 10 also peeled |
| 0.5 | Second stamper 11 also peeled | Only second stamper 11 peeled |
| 1 | Second stamper 11 also peeled | Part of first stamper 10 peeled |
| 5 | Second stamper 11 also peeled | Only second stamper 11 peeled |
| 10 | Second stamper 11 also peeled | Only second stamper 11 peeled |
| 15 | Second stamper 11 also peeled | Part of first stamper 10 peeled |
| 20 | Second stamper 11 also peeled | Only second stamper 11 peeled |

It is understood from Table 4 that in the case of peeling from the first stamper 10, the second stamper 11 is peeled at the same time, regardless of the value of R2−R1, as per the Example 1. In the case of peeling from the second stamper 11, on the other hand, tendency similar to that of the Example 1 was observed. That is, only the second stamper 11 was peeled easily when the value of R2−R1 was 0.5 mm or greater, but part of the first stamper 10 was peeled when the value of R2−R1 was 1 mm and 15 mm. The results show that it is difficult to safely peel only the second stamper 11 by merely varying the value of R2−R1.

Example 2

Figure 10:
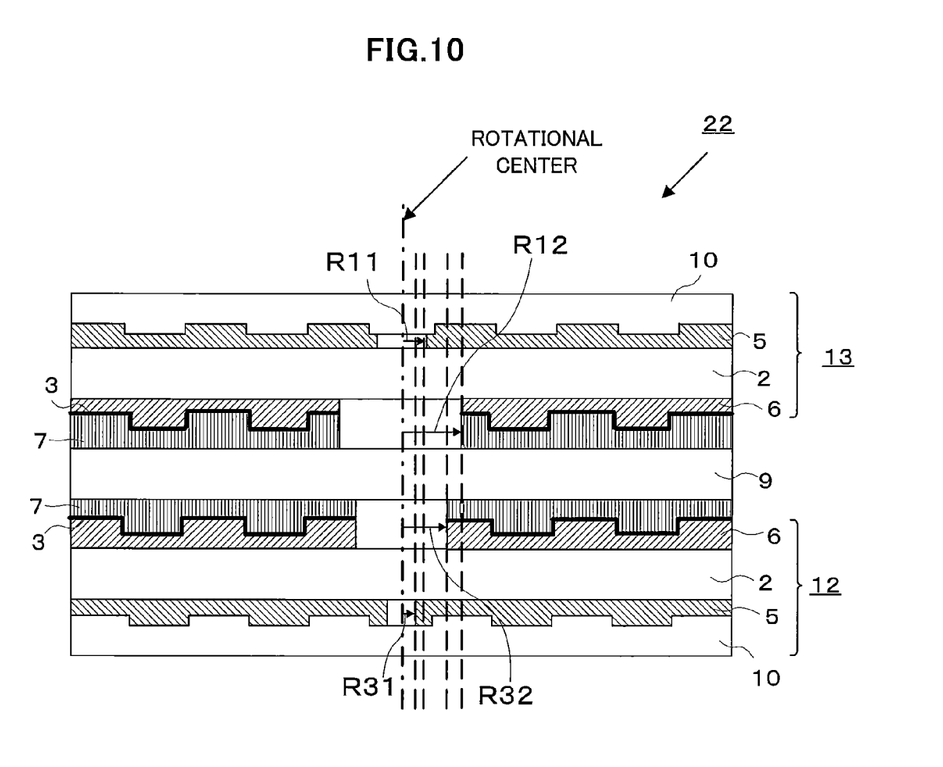
FIG. 10 is a lateral cross-sectional view of an optical information recording medium according to an Example 2 of the invention.

The advantages of the invention were checked using a sample 22 as shown in FIG. 10.

The sample 22 is a disk with a diameter of 120 mm, and is acquired by laminating the third ultraviolet-curing resin layer 7 on and under the third substrate 9, and further laminating the first block 12 on the bottom surface of the third ultraviolet-curing resin layer 7 laminated under the third substrate 9, and the second block 13 on the top surface of the third ultraviolet-curing resin layer 7 laminated above the third substrate 9.

A PC film with a thickness of 25 μm was used for the third substrate 9. A resin essentially consisting of acrylic ester free of a fluorine-contained monomer was used for the resin for forming the third ultraviolet-curing resin layer 7.

The same bases of the Example 1 were used from the first substrate 2 and the first stamper 10 both constituting the first and second blocks 12, 13.

The resins for forming the first and second ultraviolet-curing resin layers 5, 6 of the first and second blocks 12, 13 have compositions given in Table 5.

TABLE 5

| Components | Resin for forming first ultraviolet-curing resin layer 5 | Resin for forming second ultraviolet-curing resin layer 6 |
|---|---|---|
| First block 12 | | |
| Fluorine-contained monomer | 10 wt. % | 35 wt. % |
| Tetra ethylene glycol diacrylate | 45 wt. % | 30 wt. % |
| 2-methyl-2-adamantyl acrylate | 40 wt. % | 30 wt. % |
| Surface active agent | 1 wt. % | 1 wt. % |
| Photopolymerization initiator | 4 wt. % | 4 wt. % |
| Adhesion strength to stamper | F31 | F32 |
| Radius (mm) from the rotational center of first substrate 2 | R31 = 17 | R32 = 19 |
| Second block 13 | | |
| Fluorine-contained monomer | 20 wt. % | 35 wt. % |
| Tetra ethylene glycol diacrylate | 40 wt. % | 30 wt. % |
| 2-methyl-2-adamantyl acrylate | 35 wt. % | 30 wt. % |
| Surface active agent | 1 wt. % | 1 wt. % |
| Photopolymerization initiator | 4 wt. % | 4 wt. % |
| Adhesion strength to stamper | F11 | F12 |
| Radius (mm) from the rotational center of first substrate 2 | R11 = 18 | R12 = 20 |

As apparent from Table 5, the ratio of the fluorine-contained monomer content in the resin for forming the first ultraviolet-curing resin layer 5 of the first block 12 is set smaller than the ratio of the fluorine-contained monomer content in the resin for forming the first ultraviolet-curing resin layer 5 of the second block 13.

The first ultraviolet-curing resin layer 5 of the first block 12 is formed from a position away from the rotational center of the first substrate 2 by a length of R31 in a radial direction, and the first ultraviolet-curing resin layer 5 of the second block 13 is formed from a position away from the rotational center of the first substrate 2 by an length of R11 in a radial direction. Since the length of R31 in a radial direction is smaller than the length of R11 in a radial direction, the area of the first ultraviolet-curing resin layer 5 of the first block 12 is larger than the area of the first ultraviolet-curing resin layer 5 of the second block 13. Therefore, adhesion strength F31 of the first ultraviolet-curing resin layer 5 of the first block 12 to the first stamper 10 is greater than adhesion strength F11 of the first ultraviolet-curing resin layer 5 of the second block 13 to the first stamper 10.

An experiment of peeling the first stamper 10 from the second block 13 was conducted using a 180-degree peeling tester conforming to JIS K-6854-2. It was confirmed that only the first stamper 10 of the second block 13 could be peeled without peeling the first stamper 10 from the first block 12.

This application is based on Japanese Patent Application No. 2009-088430 filed on Mar. 31, 2009. The specification, claims, and drawings of Japanese Patent Application No. 2009-088430 are incorporated herein by reference in their entirety.

| | Reference Signs List |
|---|---|
| 1 | optical information recording medium |
| 2 | first substrate |
| 3 | first recording layer |
| 4 | second recording layer |
| 5 | first ultraviolet-curing resin layer |
| 6 | second ultraviolet-curing resin layer |
| 7 | third ultraviolet-curing resin layer |
| 8 | second substrate |
| 9 | third substrate |
| 10 | first stamper |
| 11 | second stamper |
| 12, 12a, 12b | first block |
| 13 | second block |
| 14 | third block |
| 15 | fourth ultraviolet-curing resin layer |
| 16 | third recording layer |
| 17 | fourth recording layer |
| 18 | fourth block |
| 19 | fifth recording layer |
| 20 | sixth recording layer |
| 21, 22 | sample |
| A | double-layered medium |
| B | four-layered medium |
| C | 2N-layered medium |

The invention claimed is:

1. A method of manufacturing an optical information recording medium having a laminate of unit layers each including a resin layer having an uneven surface and a recording layer laminated on the uneven surface of the resin layer, the method including:
   a first resin applying step of applying a first photo-curing resin to one surface of a first substrate;
   a first resin curing step of laminating a first stamper having an uneven surface on the first photo-curing resin applied to the one surface of the first substrate, and irradiating ultraviolet rays onto the first photo-curing resin via the first stamper to cure the first photo-curing resin;
   a second resin applying step of applying a second photo-curing resin to the other surface of the first substrate;
   a second resin curing step of laminating a second stamper having an uneven surface on the second photo-curing resin applied to the other surface of the first substrate, and irradiating ultraviolet rays onto the second photo-curing resin via the first second to cure the second photo-curing resin;
   a first stamper peeling step of peeling the second stamper from the second photo-curing resin; and
   a first recording layer laminating step of laminating a first recording layer on a surface of the second photo-curing resin which is exposed by peeling of the second stamper,
   wherein the first photo-curing resin and the second photo-curing resin in use have properties such that a strength of adhesion of the first photo-curing resin to the first stamper is greater than a strength of adhesion of the second photo-curing resin to the second stamper.

2. The method according to claim 1, wherein the first photo-curing resin and the second photo-curing resin contain a fluorine-contained monomer, and
   a ratio of the fluorine-contained monomer contained in the first photo-curing resin is set smaller than a ratio of the fluorine-contained monomer contained in the second photo-curing resin.

3. A method of manufacturing an optical information recording medium having a laminate of unit layers each including a resin layer having an uneven surface and a recording layer laminated on the uneven surface of the resin layer, the method including:

a first resin applying step of applying a first photo-curing resin to one surface of a first substrate;

a first resin curing step of laminating a first stamper having an uneven surface on the first photo-curing resin applied to the one surface of the first substrate, and irradiating ultraviolet rays onto the first photo-curing resin via the first stamper to cure the first photo-curing resin;

a second resin applying step of applying a second photo-curing resin to the other surface of the first substrate;

a second resin curing step of laminating a second stamper having an uneven surface on the second photo-curing resin applied to the other surface of the first substrate, and irradiating ultraviolet rays onto the second photo-curing resin via the first second to cure the second photo-curing resin;

a first stamper peeling step of peeling the second stamper from the second photo-curing resin; and a first recording layer laminating step of laminating a first recording layer on a surface of the second photo-curing resin which is exposed by peeling of the second stamper, wherein an application area of the first photo-curing resin to the first substrate is set larger than an application area of the second photo-curing resin to the first substrate.

4. The method according to claim 3, wherein the first substrate is a disk, the first resin applying step is a step of applying the first photo-curing resin to an annular region extending from a position away from a rotational center of the disk by a length of R1 in a radial direction to a periphery of the disk, the second resin applying step is a step of applying the second photo-curing resin to an annular region extending from a position away from the rotational center of the disk by an length of R2 in a radial direction to the periphery of the disk, and the length of R1 in a radial direction is smaller than the length of R2 in a radial direction.

5. A method of manufacturing an optical information recording medium having a laminate of unit layers each including a resin layer having an uneven surface and a recording layer laminated on the uneven surface of the resin layer, the method including:

a first resin applying step of applying a first photo-curing resin to one surface of a first substrate;

a first resin curing step of laminating a first stamper having an uneven surface on the first photo-curing resin applied to the one surface of the first substrate, and irradiating ultraviolet rays onto the first photo-curing resin via the first stamper to cure the first photo-curing resin;

a second resin applying step of applying a second photo-curing resin to the other surface of the first substrate;

a second resin curing step of laminating a second stamper having an uneven surface on the second photo-curing resin applied to the other surface of the first substrate, and irradiating ultraviolet rays onto the second photo-curing resin via the first second to cure the second photo-curing resin;

a first stamper peeling step of peeling the second stamper from the second photo-curing resin;

a first recording layer laminating step of laminating a first recording layer on a surface of the second photo-curing resin which is exposed by peeling of the second stamper;

a third resin applying step of applying a third photo-curing resin to a surface of the first recording layer;

a first substrate fixing step of laminating a second substrate on the third photo-curing resin applied to the surface of the first recording layer, and irradiating ultraviolet rays onto the third photo-curing resin via the second substrate to cure the third photo-curing resin, thereby fixing the second substrate;

a second stamper peeling step of peeling the first stamper from the first photo-curing resin;

a second recording layer laminating step of laminating a second recording layer on a surface of the first photo-curing resin which is exposed by peeling of the first stamper;

a fourth resin applying step of applying the third photo-curing resin to a surface of the second recording layer; and a second substrate fixing step of laminating a third substrate on the third photo-curing resin applied to the surface of the second recording layer, and irradiating ultraviolet rays onto the third photo-curing resin via the third substrate to cure the third photo-curing resin, thereby fixing the third substrate.

6. The method according to claim 5, wherein the first photo-curing resin and the third photo-curing resin in use have properties such that a strength of adhesion of the third photo-curing resin to the first recording layer is greater than a strength of adhesion of the first photo-curing resin to the first stamper.

7. The method according to claim 5, wherein the third photo-curing resin is applied thinner than the first photo-curing resin.

8. An optical information recording medium manufactured by the manufacturing method set forth in claim 1.

9. An optical information recording medium manufactured by the manufacturing method set forth in claim 3.

10. An optical information recording medium manufactured by the manufacturing method set forth in claim 5.

* * * * *